(12) United States Patent
Obara et al.

(10) Patent No.: US 8,750,077 B2
(45) Date of Patent: Jun. 10, 2014

(54) ACOUSTIC RANGING SYSTEM FOR MULTI-LINE TOWED ACOUSTIC ARRAYS

(75) Inventors: Michael J. Obara, North Kingstown, RI (US); Timothy B. Straw, Narragansett, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 243 days.

(21) Appl. No.: 13/531,808

(22) Filed: Jun. 25, 2012

(65) Prior Publication Data

US 2013/0343160 A1 Dec. 26, 2013

(51) Int. Cl.
*G01S 15/08* (2006.01)
(52) U.S. Cl.
USPC ........................................................ 367/130
(58) Field of Classification Search
USPC .............. 367/130, 127, 118, 6, 2, 20, 19, 106
See application file for complete search history.

(56) References Cited

U.S. PATENT DOCUMENTS

| | | | | |
|---|---|---|---|---|
| 7,660,192 B2* | 2/2010 | Paulsen | | 367/19 |
| 2002/0087156 A1* | 7/2002 | Maguire et al. | | 606/41 |
| 2006/0256654 A1* | 11/2006 | Paulsen | | 367/20 |
| 2013/0343160 A1* | 12/2013 | Obara et al. | | 367/106 |
| 2014/0029381 A1* | 1/2014 | Sorli | | 367/19 |

* cited by examiner

*Primary Examiner* — Daniel Pihulic
(74) *Attorney, Agent, or Firm* — James M. Kasischke; Michael P. Stanley

(57) ABSTRACT

An acoustic ranging system and method of use is provided that measures the magnitude of the separation of a pair of towed acoustic line arrays at a discrete point along the length of each array. One array acts as the measurement source, while the other array acts as a frequency-shifted echo repeater. The source array incorporates one sonar transmitter and two sonar receivers. The system further includes a configurable frequency shifter that enables one measurement source to make measurements with multiple repeater arrays.

16 Claims, 2 Drawing Sheets

ACOUSTIC RANGING SYSTEM FOR MULTI-LINE TOWED ACOUSTIC ARRAYS

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an acoustic ranging system for multi-line towed acoustic arrays. More particularly, the present invention provides an acoustic ranging system that measures the magnitude of the separation of a pair of towed acoustic line arrays at a discrete point of the array in such a manner as to eliminate a multitude of measuring errors.

(2) Description of the Prior Art

Towed underwater acoustic sonar arrays are employed onboard surface ships, submarines and unmanned undersea vehicles to detect ships, marine life, marine geology, and other underwater sound sources. The towed sonar array comprises a long cable that trails the employed vehicle when the array is deployed.

Acoustic sensing elements, called hydrophones, are placed throughout the cable. The hydrophones of the array can be used individually to detect sound sources, but the real value of the hydrophones servicing the array is in the signal processing technique of sonar beamforming.

Sonar beamforming is a signal processing technique used in acoustic arrays for directional signal reception. The beamforming technique involves combining delayed signals from each hydrophone of the acoustic array at slightly different times, so that every signal reaches the output of the array at exactly the same time, making one loud signal, as if the signal came from a single sensitive hydrophone. By properly selecting the delayed signals, the array under consideration can effectively be steered to enhance the gain in one direction while decreasing gain in other directions. However, the relative position of each individual sensing element, such as the hydrophone, should be precisely known in order to properly select each time delay.

In a towed acoustic array that is lying perfectly straight, the positions are fairly straightforward to measure. However, various hydrodynamic forces acting on a towed array as the array travels through the water induce enough movement in the individual sensing elements that a straight-line approximation is no longer valid. Some techniques should be used to estimate the actual positions of the sensing elements and known so-called shape estimators perform this function.

Typical towed arrays shape estimators perform an integration operation over a combination of parameters, such as pressure (depth) and heading sensors positions located throughout the array, along with tow ship and array physical parameters so as to calculate the positions of the sensing elements. Current techniques are able to provide acceptable error margins for the determination of these positions in most applications for towed arrays.

In addition to the consideration of the difficulties of the estimation of the actual position of the sensing elements, one of the problems with towed arrays is their so-called left/right ambiguity. Without requesting the tow ship to perform maneuvers, it is difficult if not impossible to know if a sound source is coming from the left or right side of the array being utilized. More particularly, the beams that are generated by beamforming for an approximately linear array are conical in nature, leading to an ambiguity that rotates a full 360 degrees around the array.

To combat the ambiguity problem, some modern towed systems employ two or more arrays that are towed alongside each other. In this case, proper beamforming can estimate the relative depth/elevation and unambiguous direction of the sound source. In addition, utilization of the two arrays makes the whole system able to identify a quiet source on one side of the array in the presence of a loud source on the other side of the array. The difficulty with this technique is that the shape of the array estimation becomes more critical.

Errors that could previously be tolerated in a single array may no longer be acceptable in a multiline system that employs multiple arrays. This non-tolerance is more fully described by authors Cox, H., Lai, H., Heaney, K., & Murray, J. (2003) in the technical article entitled "Hybrid Adaptive Beamforming for Multi-line Arrays" discussed in *Signals, Systems and Computers*, (2003), and included in the *Conference Record of the Thirty-Seventh Asilomar Conference on pages* 1858-1862. As an example for this non-tolerance, a two degree measurement error in heading may not be significant in a single-line system, but in a multi-line system (if the two degree measurement error occurs) it may cause arrays to cross over each other which can be highly detrimental to the calculations being performed for the multi-line system.

Accuracy requirements for a multi-line towed acoustic array may be achieved by adding in a system for measuring line-to-line separation at discrete points along the arrays. Current systems do this acoustically, using one array in one line as the transmitter and the other array in the other line as the receiver. Raw data is sent from the measurement station in each line of the array back to the tow vehicle, where the two data sources are compared by means of an envelope correlator contained in the tow vehicle and used with the speed of sound in water to create a range estimate.

Measurement resolution is based on integration time and signal center frequency. As either of these two parameters increases, resolution improves. Integration time is fixed due to the motion of the array in the water. As the signal center frequency increases, the required data bandwidth servicing a hydrophone increases as well. To make useful measurements, a single range measurement system in a modern multi-line array may require sixteen or more times the bandwidth of a single hydrophone channel.

Since a number of stations are needed, this required bandwidth puts an extreme load on the array data telemetry system. Depending on the particular array, range measurement may require tens of kilo-samples per second using conventional techniques. It is therefore desired that a ranging system be provided that uses the equivalent of only a few samples per second.

To avoid the problems associated with range measurement systems having high bandwidths; a lower-bandwidth alternative to sending raw data can be achieved if the measurement stations in all arrays are synchronized in time. In this case, a unidirectional acoustic signal path is used. One array is the transmitter in one line and another is the receiver in the other line.

Since the receiver detects when the signal was transmitted because of the synchronization; the receiver is able to calculate transmit time internally and send only the correct result by way of the array telemetry to the tow ship. This solution is not viable in many towed array systems for the reason that synchronization among the engineering sensors (heading, depth, range) is not always guaranteed or achievable. It is desired that a ranging system be provided for multi-line towed acoustic arrays that does not require synchronization between its arrays, while still achieving accurate measurements.

A further additional consideration for ranging systems for multi-line towed acoustic arrays, is the ability for the receivers in the source array of the towed arrays to be able to distinguish the arriving signals from; 1) the transmitted signal emanating from the same hose of the multi-array having provisions for carrying both arriving and transmitting signals; and 2) the echo from different arrays when there is more than one repeater array present in the system. It is desired that a ranging system be provided for multi-line towed arrays that correctly interprets arriving and transmitted signals carried by the same hose and also correctly interprets echo signals from repeaters in the array.

Another parameter of interest is the parameter of dissimilar stretches in the towed arrays. Towed arrays stretch when under tension, and imperfect manufacturing tolerances may cause two towed arrays to stretch unevenly. This error, called array skew, increases toward the rear of the array being utilized. The amount of array skew may be calculated from the data that is collected for measuring separation of the elements of the array being utilized. It is desired that a ranging system be provided for multi-line towed acoustic arrays that accommodates for array skew in its measurement technique.

SUMMARY OF THE INVENTION

Accordingly, it is a general purpose and primary object of the present invention to provide a ranging system for multi-line towed acoustic arrays having a low bandwidth; thereby yielding a relatively low sampling rate for the data being utilized by the ranging system.

It is a further object of the present invention to provide a ranging system for multi-line towed acoustic arrays that is free of the need for synchronization among sensing and measuring elements.

It is a still further object of the present invention to provide an acoustic ranging system for multi-line towed acoustic arrays that yields data corresponding to the accurate locations of the sensors being utilized by the ranging system.

It is a still further object of the present invention to provide an acoustic ranging system for multi-line towed acoustic arrays that accommodates for array skew, so as to yield accurate range measurements.

In accordance with the present invention, an arrangement comprising a source array and an echo repeater array is provided. Each of the source and echo repeater arrays has a centerline. The source and repeater arrays are separated from each other relative to their centerlines by a distance and by an array skew.

The source array comprises a signal generator, a transmitter providing an output, and first and second receivers each receiving a signal. The echo repeater array comprises a receiver for receiving the output of the transmitter of the source array, a configurable frequency shifter, and a transmitter for transmitting a signal that is received by the first and second receivers of the source array.

The arrangement provides a system which measures the magnitude of the separation between the source array and the echo repeater array at a discrete point along the length of each array. The source array acts as the measurement source, while the echo repeater array acts as a configurable frequency-shifted echo repeater. The source array incorporates one sonar transmitter and two sonar receivers.

The configurable frequency shifter of the echo repeater array enables one measurement source to make measurements, so as to cooperatively operate with multiple repeater arrays, as in a multi-line towed acoustic array system. The arrangement of the present invention, among other benefits, uses several orders of magnitude less digital data bandwidth than prior art systems, while at the same time requiring no synchronization between the source array and the echo repeater array.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
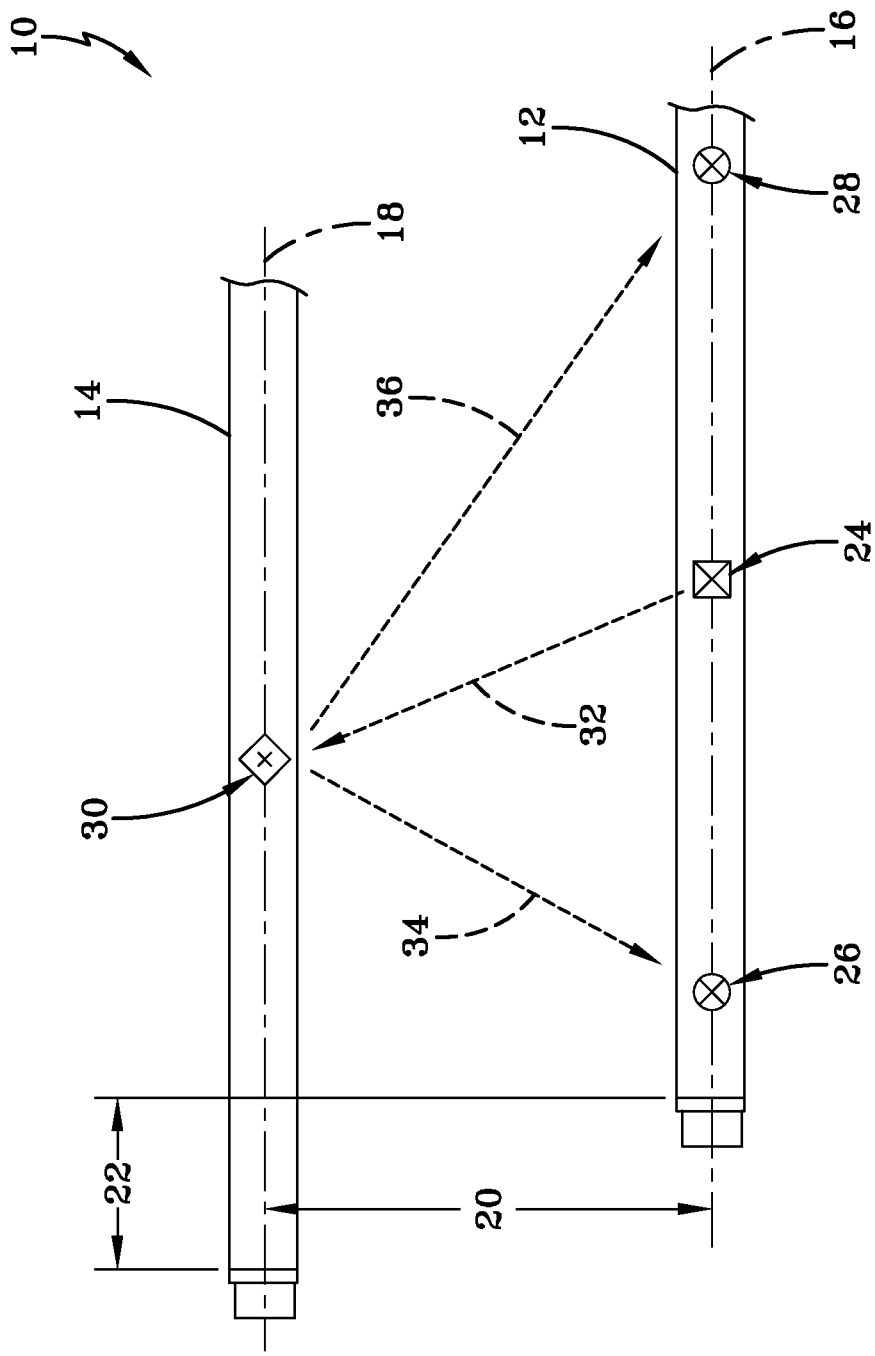
FIG. 1 illustrates the arrangement and locations of the components comprising the acoustic ranging system of the present invention.

Referring now to the drawings and more particularly to FIG. 1, there is shown an acoustic ranging system 10 that determines the distance between two towed arrays, that is, a source array 12 and an echo repeater array 14. This determined distance is required, as will be further described hereinafter, to accurately perform adaptive beamforming used, among other things, to differentiate signals as arriving from the left or from the right of the pair of arrays, 12 and 14.

The source array 12 has a centerline 16, while the echo repeater array 14 has a centerline 18. The source array 12 and echo repeater array 14 are separated from each other, relative to their centerlines 16 and 18, as shown in FIG. 1, by a distance 20 and by an array skew 22. The source array 12 has a signal generator and transmitter 24, first and second receivers 26 and 28, whereas the echo repeater array 14 has a receiver 30 that has a configurable frequency shifter to be described with reference to FIG. 2. As seen in FIG. 1, the signal generator and transmitter 24 transmit an acoustic signal 32 to the receiver 30, and similarly, the receiver 30 transmits acoustic signals 34 and 36 respectively to receivers 26 and 28.

The acoustic ranging system 10, as will be further described hereinafter, performs an operation without the need of high bandwidth data and without the need of synchronization between the source array 12 and the echo repeater array 14, while at the same time measuring separation and array skew both measured between the source array and the echo repeater array.

Figure 2:
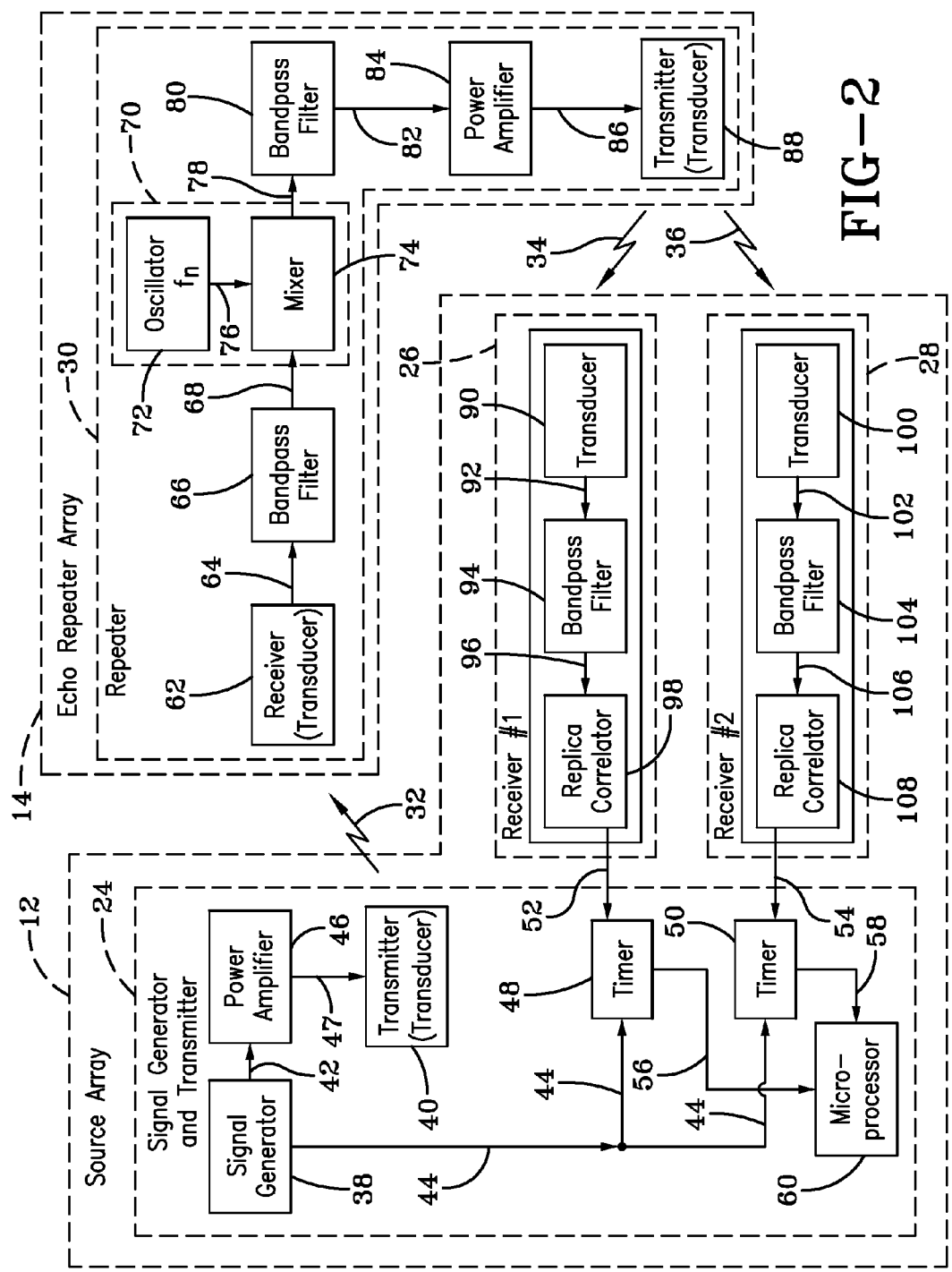
FIG. 2 is a block diagram of the acoustic ranging system of FIG. 1.

As seen in FIG. 2, the signal generator and transmitter 24 is comprised of a signal generator 38 and transmitter 40 which in actuality is a transducer. The signal generator 38 provides first and second outputs 42 and 44, wherein the output 42 is routed to a power amplifier 46 which, in turn, provides an output 47 that is routed to the transmitter 40.

The second output 44 of signal generator 38 is routed to a first timer 48 and a second timer 50. The first and second timers 48 and 50 respectively receive input signals 52 and 54, to be further described hereinafter, that respectively provide output signals 56 and 58 that are both routed to a microprocessor 60.

As further seen in FIG. 2, the signal generator and transmitter 24 provides an output signal 32 (also shown in FIG. 1), via a transmitter 40, that is an acoustic signal and is received by the receiver 30 (also shown in FIG. 1), and in particular receiver 62 (shown in FIG. 2), which in actuality is a second transducer. The receiver (transducer) 62 provides an output signal 64 that is routed to a first bandpass filter 66 which, in turn, provides an output signal 68 that is routed to a configurable frequency shifter 70.

The configurable frequency shifter 70 is composed of an oscillator 72 having a selectable frequency $f_n$, and a mixer 74. The terminology for the configurable frequency shifter 70 is used herein to represent that the frequency $f_n$ may be selected (configured) to meet the operational parameters of the system. The oscillator 72 provides an output signal 76 that is routed to the mixer 74.

The output of the configurable frequency shifter 70, in particular, the mixer 74 provides an output signal 78 that is routed to a second bandpass filter 80 which, in turn, provides an output signal 82 which, in turn, is routed to a second power amplifier 84. The power amplifier 84 provides an output signal 86 that is routed to a transmitter 88 (which in actuality is a transducer) and which provides the acoustical signals 34 and 36 (also shown in FIG. 1).

The receiver 26 shown in FIG. 2, in particular, a third transducer 90 receives the acoustical signal 34. The transducer 90 produces an output signal 92 that is routed to a third bandpass filter 94 which, in turn, provides a signal 96 that is routed to replica correlator 98 which, in turn, provides the input signal 52 to the timer 48—as previously discussed.

The receiver 28, in particular, the transducer 100 receives the acoustical signal 36 and provides an output signal 102 that is routed to a fourth bandpass filter 104. The bandpass filter 104 provides an output signal 106 that is routed to replica correlator 108 which, in turn, provides the input signal 54 to the timer 50—as previously discussed.

In Operation

In general, and with reference to FIG. 2, two arrays, such as 12 and 14, from a multi-line system are selected for measurement purposes. Once the arrays 12 and 14 are identified, the signal generator and transmitter 24 projects an acoustic signal 32 by way of the transmitter 40 (transducer). The transmitted signal 32 is received by receiver 30, processed and rebroadcast back to be received by the first receiver 26 and the second receiver 28 by way of the acoustic signals 34 and 36 respectively. Calculations are performed by the microprocessor 60 that generate the quantities array separation 20 and array skew 22 (shown in FIG. 1). Someone versed in the art can generate these equations using simple geometry. The quantities array separation 20 and array skew 22 are transmitted, via a low bandwidth connection, provided by a conventional array telemetry system back to a signal processor (not shown) onboard the tow ship (not shown).

More particularly, and again with reference to FIG. 2, in the source array 12, an electronic signal is generated by the signal generator 38 amplified by the power amplifier 46, converted to acoustic energy by the transmitter (transducer) 40 and transmitted through the water. At the same time the electronic signal generated by the signal generator 38, by means of the operation of either timer 48, the receiver 26 and the microprocessor 60 or the timer 50, the receiver 28 and microprocessor 60, is put into an replica correlator, contained in the signal processor onboard the tow ship, that is matched to the frequency spectrum of the transmitted signal 32. In the receiver 30, the transmitted signal 32 is received, filtered, frequency-shifted, bandpass-filtered, amplified, converted back to acoustic energy and transmitted as signals 34 and 36 and accepted by receivers 26 and 28, respectively.

The receivers 26 and 28 convert the acoustic signals 34 and 36 back to electronic signals, filter, and run the electronic signals through the replica correlators 98 and 108 respectively, with parameters matched to the expected receiver 30 frequency shifted signal created by the operation of the oscillator 72 and mixer 74 comprising the configurable frequency shifter 70.

The outputs from the now received quantities, created by the configurable frequency shifter 70 present at the replica correlator 98 and 108 are compared to those derived from the already existing quantities previously formed by the receivers 26 and 28, the replica correlators 98, 108 and timers 48 and 50 and calculated with the assistance of microprocessor 60.

The microprocessor 60 is used to remove all fixed time delays and leave only the acoustic propagation time. This value is then transmitted by way of the array telemetry (not shown) to be interpreted onboard the tow ship (not shown) in the signal processing equipment (not shown) therein. The signal processing equipment, via techniques known in the art, calculates the distance 20 between arrays 12 and 14, and also the array skew 22.

It should now be appreciated that the practice of the present invention provides an acoustic ranging system for multi-line towed acoustic arrays that accurately measures the magnitude of the separation of a pair of towed acoustic line arrays at a discrete point along the length of each array, while at the same time producing a measurement of the distance 20 separating the arrays 12 and 14 and array skew 22.

It should be further appreciated that the practice of the present invention provides an acoustic ranging system for multi-line towed acoustic arrays that can operate regardless of synchronization of towed arrays engineering sensors (known in the art) with respect to each other.

It should also be appreciated that the practice of the present invention provides an acoustic ranging system for multi-line towed acoustic arrays that may incorporate the feature that by calculating round trip acoustic propagation delay internal to the array comprised of the source array 12 and the echo repeater array 14, bandwidth requirements are decreased by several orders of magnitude regardless of signal center frequency being utilized It should now be still further appreciated that the practice of the present invention provides an acoustic ranging system for multi-line towed acoustic arrays that allows for the capability to select high transmit frequencies, so as to permit increased measurement accuracy.

Furthermore, it should now be appreciated that the practice of the present invention provides an acoustic ranging system for multi-line towed acoustic arrays that allows for the capability to select high transmit frequencies, so as to allow shorter integration times and, thus, more range measurement samples per second.

In addition, it should now be appreciated that the practice of the present invention provides an acoustic ranging system for multi-line towed acoustic arrays that allows for the use of a configurable frequency shifter that permits tailoring of the principles of the invention to service several arrays at once as occurring in multi-line configuration systems.

Moreover, in addition to above described embodiments, there are a few alternate configurations which can be included as part of the practice of the present invention such as; 1) the horizontal component of array separation can be calculated from the absolute separation between arrays by incorporating values from nearby pressure sensors; 2) additional receiver stations can be added to the source array 12 to improve measurement accuracy; 3) the signal generator 38 can be reprogrammed remotely to upload new transmit signatures, so as to better adapt the practice of the present invention to different environments; 4) instead of transmitting back a frequency-shifted version of what it receives, the echo repeater array 14 may have its own replica correlator and signal generator so that it can reply with any preprogrammed signature; and 5) if there are only two arrays in the system, such as arrays 12 and 14, the mixer 74 and oscillator 72 can be removed from the receiver 30 to simplify the hardware and software implementation.

It will be understood that many additional changes in the details, materials, steps and arrangement of parts, which have been herein described and illustrated in order to explain the nature of the invention, may be made by those skilled in the art within the principle and scope of that expressed in the appended claims.

What is claimed is:

1. An acoustic ranging system comprising:
    a source array with a centerline and including a signal generator, a transmitter capable of providing an output, and first and second receivers with each capable of receiving a signal; and
    an echo repeater array with a centerline and including a receiver for receiving the output of said transmitter of said source array, a configurable frequency shifter, and a transmitter for transmitting a signal that is received by both said first and second receivers of said source array;
    wherein said source array and said echo repeater array are separated from each other relative to their centerlines by a distance and by an array skew.

2. The acoustic ranging system according to claim 1, wherein said signal generator is capable of providing first and second output signals and comprises:
    a first power amplifier that receives the first output of said signal generator and is capable of providing an output;
    first and second timers that both receive the second output of said signal generator and wherein each of said first and second timers is capable of receiving an input signal and is capable of providing an output signal; and
    a microprocessor that receives each of the output signals from said first and second timers.

3. The acoustic ranging system according to claim 2, wherein said transmitter comprises a first transducer that receives the output signal of said first power amplifier and is capable of providing an output signal.

4. The acoustic ranging system according to claim 3, wherein said echo repeater array comprises a second transducer which receives the output signal of said transmitter and said second transducer being capable of providing an output signal which is routed to a first bandpass filter to provide an output signal.

5. The acoustic ranging system according to claim 4, wherein said configurable frequency shifter comprises an oscillator and a mixer with said oscillator capable of providing an output having an assigned frequency $f_n$, said mixer capable of receiving the output signal of said first bandpass filter and the output of said oscillator with said mixer capable of providing an output signal.

6. The acoustic ranging system according to claim 5, wherein said echo repeater array further comprises a second bandpass filter having an input capable of receiving the output of said mixer and capable of providing an output routed to a second power amplifier having an output that, in turn, is routed to a third transducer that provides an output signal that is receivable by said first and second receivers of said source array.

7. The acoustic ranging system according to claim 6, wherein said first receiver includes a fourth transducer for receiving the output signal of said third transducer, said fourth transducer capable of providing an output signal that is routed to a third bandpass filter that, in turn, provides an output signal that is routed to a first replica correlator that, in turn, is capable of providing an input signal to said first timer.

8. The acoustic ranging system according to claim 7, wherein said second receiver further provides a fifth transducer for receiving the output signal of said third transducer, said fifth transducer capable of providing an output signal that is routed to a fourth bandpass filter that, in turn, is capable of providing an output signal that is routed to a second replica correlator that, in turn, is capable of providing an input signal to said second timer.

9. A method for measuring distance and an array skew between at least two arrays of a multi-line towed acoustic array, said method comprising the steps of:
    providing an arrangement of a source array and an echo repeater array, each of the source array and echo repeater array having a centerline, the source array and repeater arrays being separated from each other relative to their centerlines by a distance and by an array skew with the source array comprising a signal generator, a transmitter for providing an output, and first and second receivers each for receiving a signal; and the echo repeater array comprising a receiver for receiving the output of the transmitter of the source array, a configurable frequency shifter, and a transmitter for transmitting a signal that is received by both the first and second receivers of the source array.

10. The method according to claim 9, wherein the provided signal generator includes a signal generator providing first and second output signals; a first power amplifier that receives the first output of the signal generator and provides an output; first and second timers that both receive the second output of the signal generator and wherein each of the first and second timers receives an input signal and provides an output signal; and a microprocessor that receives each of the output signals from the first and second timers.

11. The method according to claim 10, wherein the transmitter comprises a first transducer that receives the output signal of the power amplifier and provides an output signal that is transmitted to the echo repeater array.

12. The method according to claim 11, wherein the echo repeater array includes a second transducer which receives the acoustic output signal of the transmitter of the source array and the second transducer of the echo repeater array to provide an output signal which is routed to a first bandpass filter which, in turn, provides an output signal.

13. The method according to claim 12, wherein the configurable frequency shifter includes an oscillator and a mixer with the oscillator providing an output having an assigned frequency $f_n$, the mixer receiving the output signal of the first bandpass filter and the output of the oscillator and with the mixer providing an output signal.

14. The method according to claim 13, wherein the echo repeater array further comprises a second bandpass filter having an input receiving the output of the mixer and providing an output that is routed to a second power amplifier having an output that, in turn, is routed to a third transducer that provides an output signal that is received by the first and second receivers of the source array.

15. The method according to claim 14, wherein the provided first receiver provides a fourth transducer for receiving the output signal of the third transducer, the fourth transducer providing an output signal that is routed to a third bandpass filter that, in turn, provides an output signal that is routed to a first replica correlator that, in turn, provides the input signal to the first timer.

16. The method according to claim 15, wherein the provided second receiver further provides a fifth transducer for receiving the output signal of the third transducer, the fifth transducer providing an output signal that is routed to a fourth bandpass filter that, in turn, provides an output signal that is routed to a second replica correlator that, in turn, provides the input signal to the second timer.

* * * * *